(12) United States Patent
Hayakawa et al.

(10) Patent No.: US 7,472,765 B2
(45) Date of Patent: Jan. 6, 2009

(54) LEGGED MOBILE ROBOT

(75) Inventors: Masato Hayakawa, Wako (JP); Susumu Miyazaki, Wako (JP); Satoshi Shigemi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 11/225,013

(22) Filed: Sep. 14, 2005

(65) Prior Publication Data
US 2006/0060394 A1 Mar. 23, 2006

(30) Foreign Application Priority Data
Sep. 17, 2004 (JP) ............... 2004-271614

(51) Int. Cl.
*B25J 5/00* (2006.01)
(52) U.S. Cl. ...................... 180/8.6; 361/224
(58) Field of Classification Search .......... 180/8.1; 361/223, 224
See application file for complete search history.

(56) References Cited

U.S. PATENT DOCUMENTS

| 2,904,724 | A | * | 9/1959 | Mendoza | 361/224 |
| 3,274,442 | A | * | 9/1966 | Peel | 361/224 |
| 3,293,494 | A | * | 12/1966 | Fischer | 361/224 |
| 3,544,841 | A | * | 12/1970 | Peel | 361/224 |
| 4,727,452 | A | * | 2/1988 | Brownlee | 361/224 |
| 5,808,433 | A | * | 9/1998 | Tagami et al. | 318/568.12 |

FOREIGN PATENT DOCUMENTS

| DE | 19628911 | 1/1998 |
| EP | 0765797 | 4/1997 |
| EP | 1203539 | 5/2002 |
| FR | 2524275 | 10/1983 |
| JP | 04122595 | 4/1992 |
| JP | 6-9098 | 2/1994 |
| JP | 09-094785 | 4/1997 |
| JP | 11-138488 | 5/1999 |
| JP | 2001-129774 | 5/2001 |
| JP | 2001-267094 | 9/2001 |

* cited by examiner

*Primary Examiner*—Kevin Hurley
(74) *Attorney, Agent, or Firm*—Squire, Sanders & Dempsey L.L.P.

(57) ABSTRACT

In a legged mobile robot having an electric motor installed at a location between a foot and each leg to drive the ankle joint, a force sensor installed at the location between the foot and each leg to detect a floor reaction force acting from a floor surface on which the foot lands, and a cushioning member attached to the foot sole to cushioning impact that occurs when the foot lands on the floor surface, conductive members are disposed in depressions formed at the cushioning member, such that the conductive members contact the floor surface when the cushioning member contracts, thereby discharging and removing static electric charge electrified on the foot.

5 Claims, 6 Drawing Sheets

LEGGED MOBILE ROBOT

BACKGROUND OF THE INVENTION

1. Field of the Invention

This invention relates to a legged mobile robot, particularly to a legged mobile robot that enables removal of static electric charge electrified or accumulated in the robot's feet by electrical discharge.

2. Description of the Related Art

Japanese Laid-Open Patent Application No. Hei 9(1997)-94785 teaches a legged mobile robot. The legged mobile robot of this reference has a body, two legs connected to the body, and feet connected to the distal ends of the legs through ankle joints. Each leg is equipped with at least an electric motor for driving a second joint between the foot and leg and a force sensor that detects floor reaction force acting on the robot from the floor surface contacted by the foot. The feet of this legged mobile robot are composed of flat frames made of aluminum, for example, and elastic member made of cushioning material such as urethane rubber, adhered to the soles of the feet for absorbing the impact produced when the feet make contact with the floor.

When such a legged mobile robot moves across a floor, static electric charge (static electricity) may accumulate in the robot owing to friction between the elastic member and the floor and/or friction between the links constituting the legs and the like. Japanese Laid-Open Utility Model Application No. Hei 6 (1994)-09098, Japanese Laid-Open Patent Application No. Hei 11(1999)-138488 and Japanese Laid-Open Patent Application No. 2001-267094 teach techniques for discharging electrified static electric charge. The second reference '098 teaches an automatic guided (unmanned) vehicle equipped with a contacting device (discharging device) that comprises contact plates, contacts and conductors and operates to equalize the potential of the charge electrified on the vehicle and that of the facility bearing the workpiece. The third reference '488 and fourth reference '094 are similarly directed to removal of the charge electrified in a fixed industrial robot by discharging it.

In legged mobile robots, since the electrified static electric charge, when large in terms of amount of energy, may sometimes acts as noise for force sensors if the sensors are mounted at a location just above the feet, the electrified charge should preferably be discharged and removed. However, the second to fourth references merely disclose discharging or removing the charge electrified on the unmanned vehicle or industrial robots and suggest nothing for the legged mobile robots.

SUMMARY OF THE INVENTION

An object of the invention is therefore to overcome the problem and to provide a legged mobile robot having a force sensor installed at its foot that can effectively discharge and remove static electric charge electrified on the foot.

In order to achieve the object, this invention provides a legged mobile robot having a body, a plurality of legs each connected to the body, and a foot connected to a distal end of each leg through an ankle joint, comprising; an electric motor installed at a location between the foot and each of the legs and driving the ankle joint; a force sensor installed at the location between the foot and each of the legs and detecting floor reaction force acting through the foot from a floor surface on which the foot lands; a cushioning member attached to the foot and cushioning impact that occurs when the foot lands on the floor surface; and a conductive member disposed in the cushioning member.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A legged mobile robot according to an embodiment of this invention will be explained with reference to the attached drawings in the following.

Figure 1:
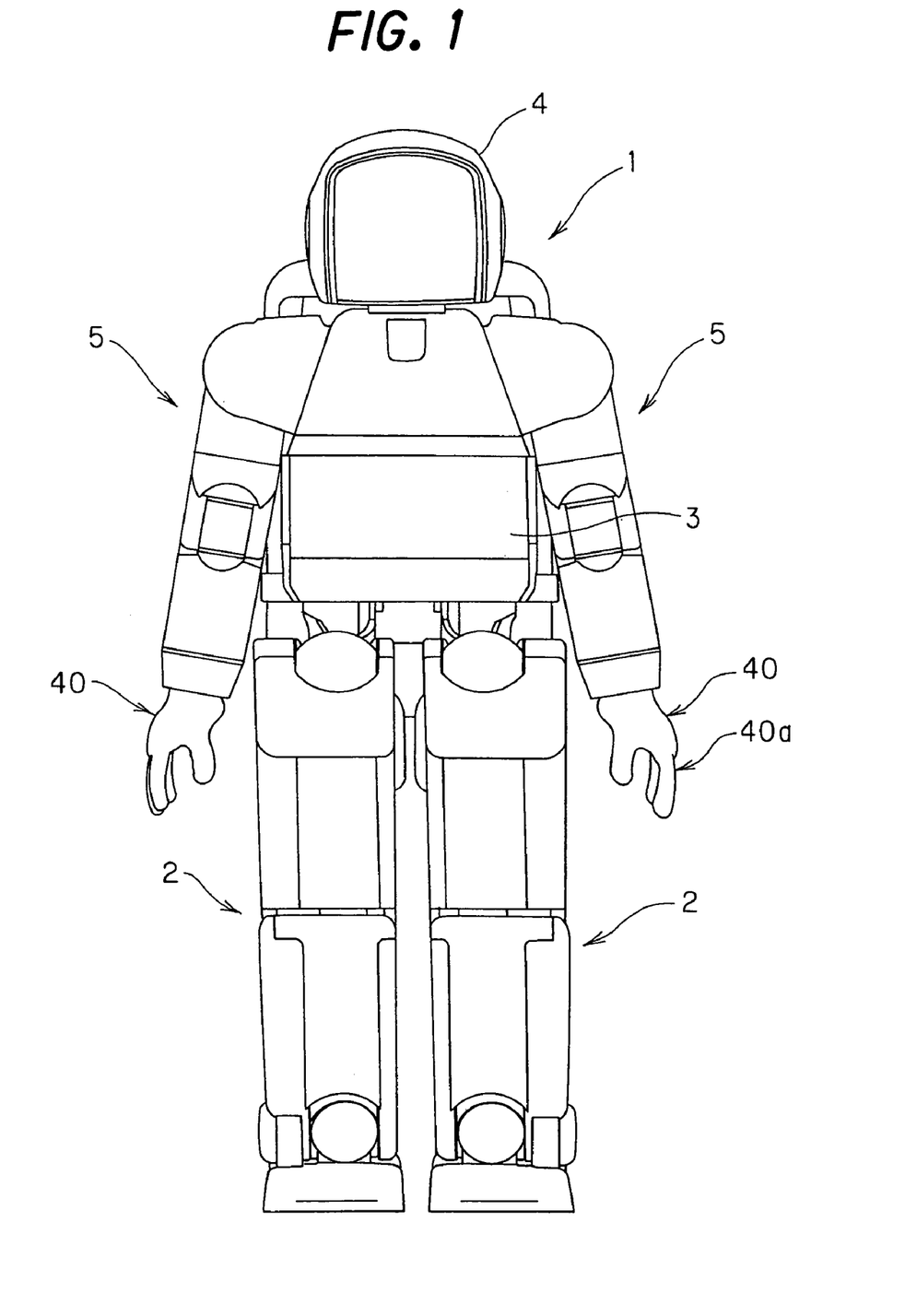
FIG. 1 is a front view of a legged mobile robot according to an embodiment of this invention.
Figure 2:
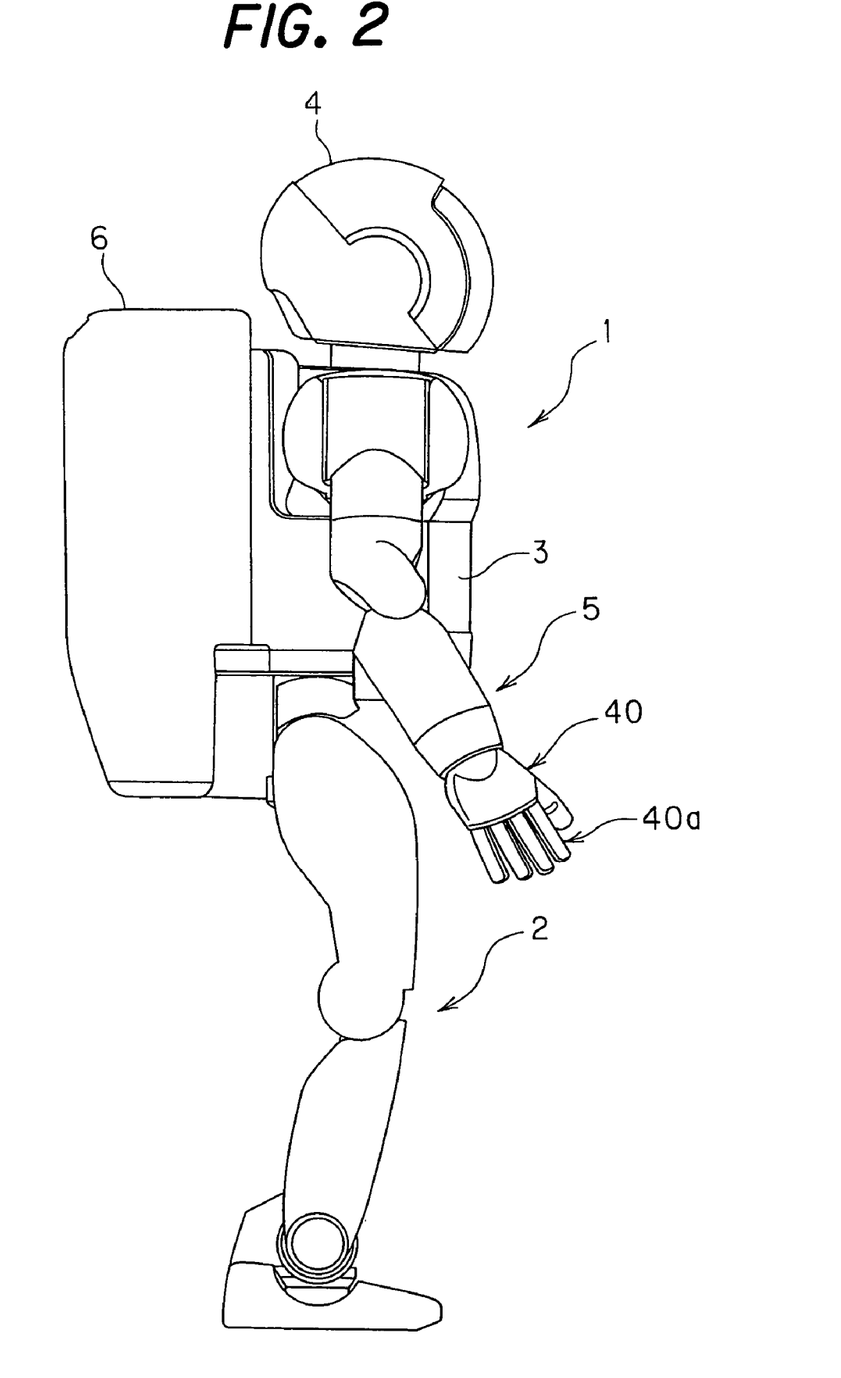
FIG. 2 is a side view of the robot of FIG. 1.

FIG. 1 is a front view of a legged mobile robot according to a first embodiment of this invention, and FIG. 2 is a side view thereof. A biped humanoid robot is taken here as an example of a legged mobile robot.

As shown in FIG. 1, the legged mobile robot (hereinafter called simply "robot") 1 is equipped with a plurality of, more specifically two legs (leg linkages) 2 and a body (main unit) 3 above the legs 2. A head 4 is formed above the body 3 and two arms (arm linkages) 5 are connected one to either side of the body 3. As shown in FIG. 2, a housing unit 6 is mounted on the back of the body 3 that accommodates therein, an electronic control unit (explained later), a battery, etc. The robot 1 shown in FIGS. 1 and 2 is equipped with covers for protecting its internal structures.

Figure 3:
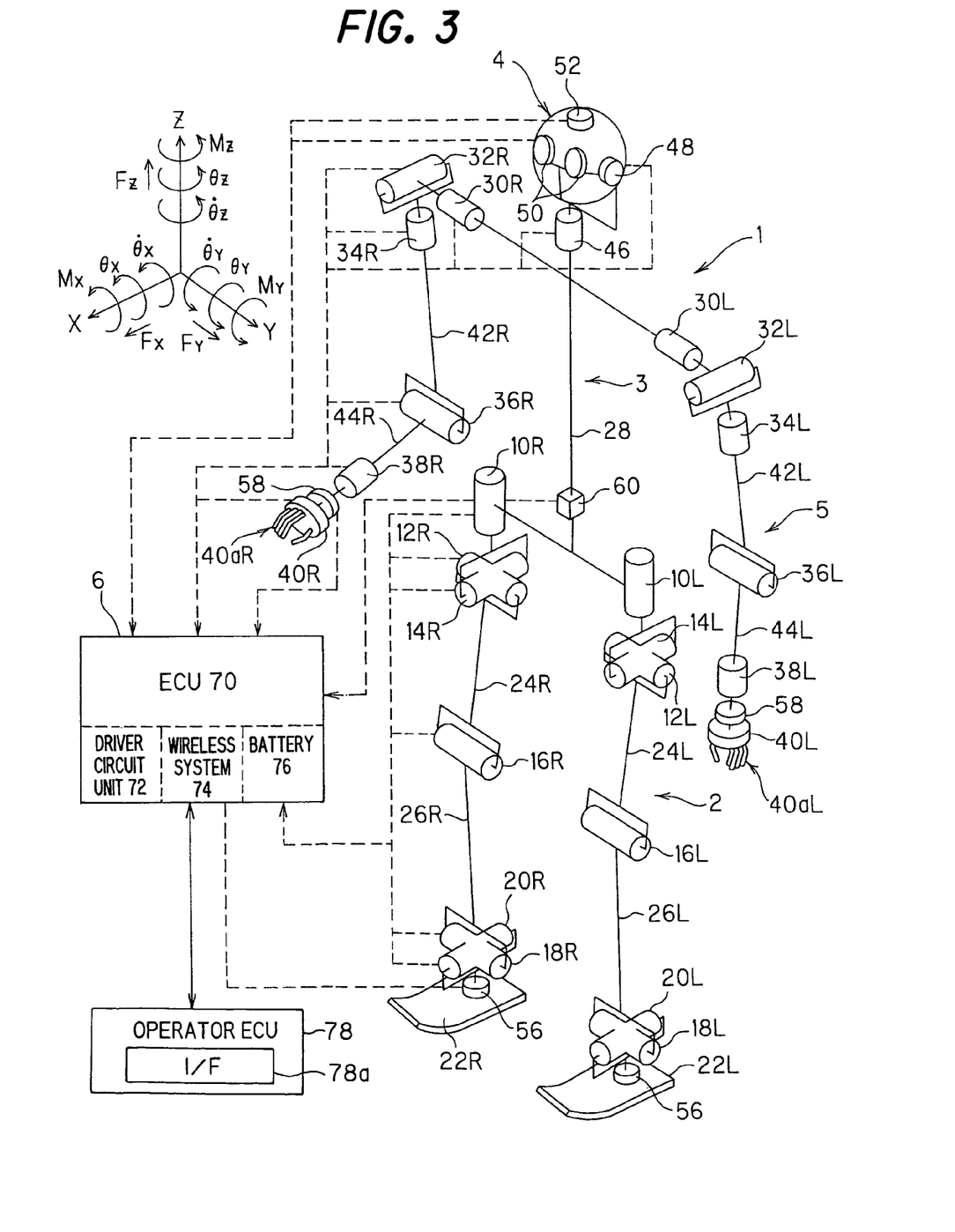
FIG. 3 is an explanatory diagram showing a skeletonized view of the robot of FIG. 1.

FIG. 3 is an explanatory diagram showing a skeletonized view of the robot 1. The internal structures of the robot 1 will be explained with reference to this drawing, with primary focus on the joints. As illustrated, the legs 2 and arms 5 on either the left or right of the robot 1 are equipped with six joints driven by eleven electric motors.

Specifically, the robot 1 is equipped at its hip (crotch) joints with electric motors 10R, 10L (R and L indicating the right and left sides; hereinafter the same) that drive joints for swinging or swiveling the legs 2 around a vertical axis (the Z axis or vertical axis), electric motors 12R, 12L that drive joints for swiveling or swinging the legs 2 in the pitch (advance) direction (around the Y axis), and 14R, 14L that drive joints for rotating the legs 2 in the roll (lateral) direction (around the X axis), is equipped at its knees with electric motors 16R, 16L that drive knee joints for rotating the lower portions of the legs 2 in the pitch direction (around the Y axis), and is equipped at its ankles with electric motors 18R, 18L that drive ankle (foot) joints for rotating the distal ends of the legs 2 in the pitch direction (around the Y axis) and electric motors 20R, 20L that drive the ankle joints for rotating them in the roll direction (around the X axis).

As set out in the foregoing, the joints are indicated in FIG. 3 by the axes of rotation of the electric motors that drive the joints or the axes of rotation of transmitting elements (pulleys, etc.) that transmits the power of the electric motors. Feet 22R, 22L are connected or attached to the distal ends of the legs 2.

In this manner, the electric motors 10R(L), 12R(L) and 14R(L) are disposed at the hip joints of the legs 2 with their axes of rotation oriented orthogonally, and the electric motors 18R(L) and 20R(L) are disposed at the ankle joints with their axes of rotation oriented orthogonally. The hip joints and knee joints are connected by thigh links 24R(L) and the knee joints and foot joints are connected by shank links 26R(L).

The legs 2 are connected through the hip joints to the body 3, which is represented in FIG. 3 simply by a body link 28. The arms 5 are connected to the body 3, as set out above.

The arms 5 are configured similarly to the legs 2. Specifically, the robot 1 is equipped at its shoulder joints with electric motors 30R, 30L that drive joints for rotating the arms 5 in the pitch direction and electric motors 32R, 32L that drive joints for rotating them in the roll direction, is equipped with electric motors 34R, 34L that drive joints for swiveling the free ends of the arms 5, is equipped at its elbow joints with electric motors 36R, 36L that drive the elbow joints for swiveling parts distal thereof, and is equipped at its wrist joints at the distal ends of the arms 5 with electric motors 38R, 38L that drive the wrist joints for swiveling the distal ends. Hands (end effectors) 40R, 40L are attached to the distal ends of the wrist joints.

The electric motors 30R(L), 32R(L) and 34R(L) are disposed at the shoulder joints of the arms 5 with their axes of rotation oriented orthogonally. The shoulder joints and elbow joints are connected by upper arm links 42R(L) and the elbow joints and wrist joints are connected by forearm links 44R(L). Each hand 40R, 40L is equipped with a mechanism that drives five fingers 40a such that the robot 1 grasps an object by fingers 40a or does other works.

The head 4 is connected to the body 3 through an electric motor 46 (that constitutes a neck joint) for rotating the head 4 around the vertical axis and a head nod mechanism 48 that rotates the head 4 around an axis perpendicular thereto. As shown in FIG. 3, the interior of the head 4 has mounted therein two CCD cameras 50 that take and generate outputs indicative of images, and a voice input/output device 52 comprising a receiver and a microphone.

Owing to the foregoing configuration, the legs 2 are each provided with 6 joints constituted of a total of 12 degrees of freedom for the left and right legs, so that during locomotion the legs as a whole can be imparted with desired movements by driving the 6 joints to appropriate angles to enable desired walking in three-dimensional space. Further, the arms 5 are each provided with 5 joints constituted of a total of 10 degrees of freedom for the left and right arms, so that desired works or tasks can be carried out by driving these 5 joints to appropriate angles. In addition, the head 4 is provided with the joint and the head nod mechanism 48 constituted of two 2 degrees of freedom, so that the head 4 can be faced in a desired direction by driving these to appropriate angles.

Each of the electric motors 10R, 10L and the like is provided with a rotary encoder that generates a signal corresponding to at least one among the angle, angular velocity and angular acceleration of the associated joint produced by the rotation of the rotary shaft of the electric motor. Specifically, the electric motors 10R, 10L and the like comprise DC servo motors.

A conventional six-axis force sensor (hereinafter referred to "force sensor") 56 is attached to each foot 22R(L) and produces outputs or signals representing, of the external forces acting on the robot, the floor reaction force components Fx, Fy and Fz of three directions and the moment components Mx, My and Mz of three directions acting on the robot 1 from the surface of contact. The force sensor 56 comprises coupled two flange portions each transmitting load acting thereon and strain gauges affixed thereto, and is configured to calculate and output the force and moment components acting on a sensor reference point based on outputs from the strain gauges.

A similar force sensor (six-axis force sensor) 58 is attached to a position between each of the wrist joints and hands 40 and produces outputs or signals representing the external forces acting on the robot other than the floor reaction force, specifically, the external force (object reaction force) components Fx, Fy and Fz of three directions and the moment components Mx, My and Mz of three directions acting on the hands 40 from the object.

An inclination sensor 60 is installed on the body 3 and produces an output or a signal representing at least one of the inclination (tilt angle) relative to the vertical axis and the angular velocity thereof, i.e., representing at least one quantity of state such as the inclination (posture) of the body 3 of the robot 1.

The outputs of the force sensor 56, etc., are sent to the electronic control unit (now assigned with reference numeral 70; hereinafter referred to as "ECU") stored in the housing unit 6 (in the figure, the input/output is shown only for the right side of the robot 1 for ease of illustration). The ECU 70 comprises a microcomputer having a CPU, a memory and an input/output interface and the like. In the housing unit 6, in addition to the ECU 70, a driver circuit unit 72 for the electric motors 10R(L), etc., a wireless system 74 and the battery (now assigned with reference numeral 76).

As shown at the lower part of FIG. 3, there is provided an operator's control unit (hereinafter called "operator ECU") 78 similarly comprising a microcomputer and having an input/output interface 78a that allows the operator to input commands to control the operation of the robot 1. The operator ECU 78 is connected to the ECU 70 through the wireless system 74 to communicate with each other, and any command such as an emergency robot stop command inputted through the interface 78a is sent to the ECU 70 through the wireless system 74.

In the configuration mentioned above, the ECU 70 generates gaits necessary for walking of the robot 1 based on gait parameters stored in the memory, calculates joint displace commands based on the generated gaits, and controls the operation of the electric motors 10R(L), etc., concerned through the driver circuit unit 72 such that the robot 1 walks in a stable posture as desired. At the same time, the ECU 70 controls the operation of the robot 1 in response to the command sent from the operator ECU 78, e.g., to stop the motion of the robot 1 immediately in response to the emergency robot stop command.

The distinctive feature of this invention is that the robot 1 is configured to discharge and thereby eliminate static electric charge (static electricity) electrified in the feet 22. The configuration for accomplishing this will now be explained.

Figure 4:
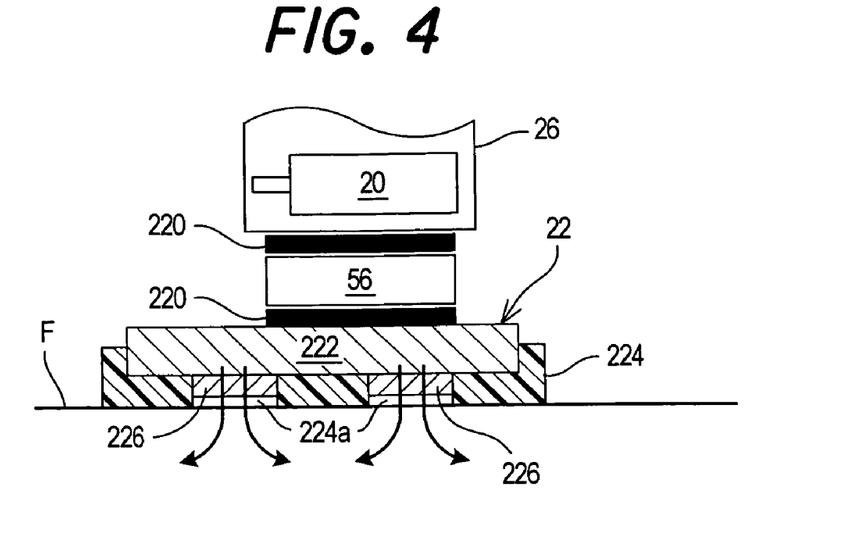
FIG. 4 is a side view schematically showing the structure of and around a foot of FIGS. 1 to 3.
Figure 5:
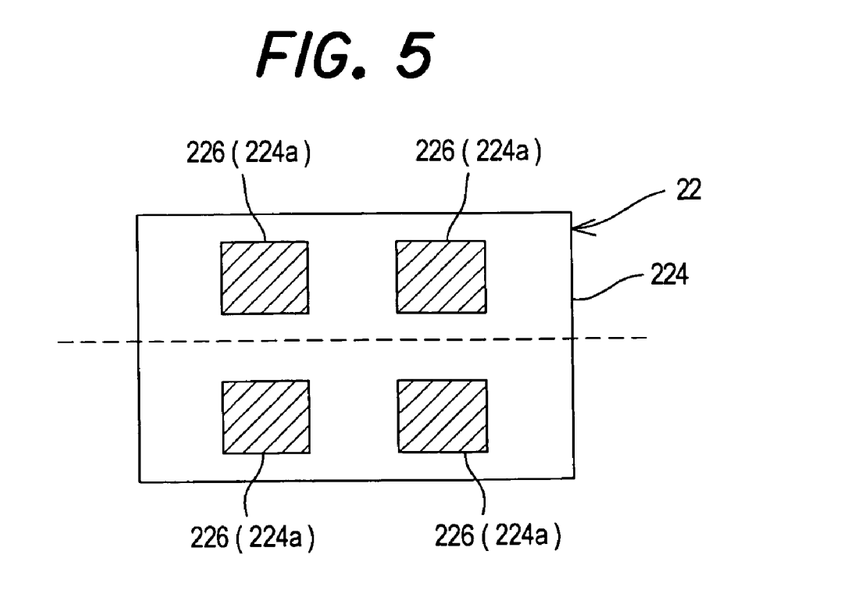
FIG. 5 is a bottom view of the foot of FIG. 4.

FIG. 4 is a side view schematically illustrating the structure of and around a foot 22 shown in FIGS. 1 to 3. FIG. 5 is a bottom view of the foot 22. The foot 22 has a structure similar to that described in the first reference mentioned above ('785).

As shown in FIG. 4, one of the electric motors 18, 20R(L) incorporated in the ankle joints, namely the electric motor 20, is installed at a location between the foot 22 and the leg 2, specifically between the foot 22 and the shank link 26 that is one member of the leg 2. The force sensor 56 is installed at a location between the foot 22 and the leg 2, more precisely at a location beneath the electric motor 20 (hereinafter, R or L is removed in the reference). The force sensor 56 is isolated for enhanced detection accuracy by an electrical insulator 220 inserted between the electric motor 20 above and the foot 22 below.

The foot 22 has a flat frame 222 made of a metal (conductor) such as aluminum. A cushioning (elastic) member 224 made of an elastically deformable material such as urethane rubber is attached to the bottom (sole) of the foot 22 that makes contact with the floor F underneath. When the foot 22 lands on the floor F, the load acting on the cushioning member 224 causes it to elastically deform as shown in FIG. 6, thereby cushioning or absorbing the impact occurring and acting on the robot 1 through the foot 22.

As shown in FIG. 5, the cushioning member 224 is formed with four depressions or cavities 224a, two on either side of the longitudinal center line of the foot 22 represented as a broken line in the drawing. An electrically conductive member 226 is accommodated in each depression 224a. The conductive member 226 is made of a metal excellent in electrical conductivity such as copper. Its one face (side) contacts the frame 222 and its other face (other side) is disposed or countersunk so as to lie inward relative to the outer surface of the cushioning member 224, i.e., the conductive member 226 is disposed in the cushioning member 224. The conductive member 226 can be made of electrically conductive rubber.

Figure 6:
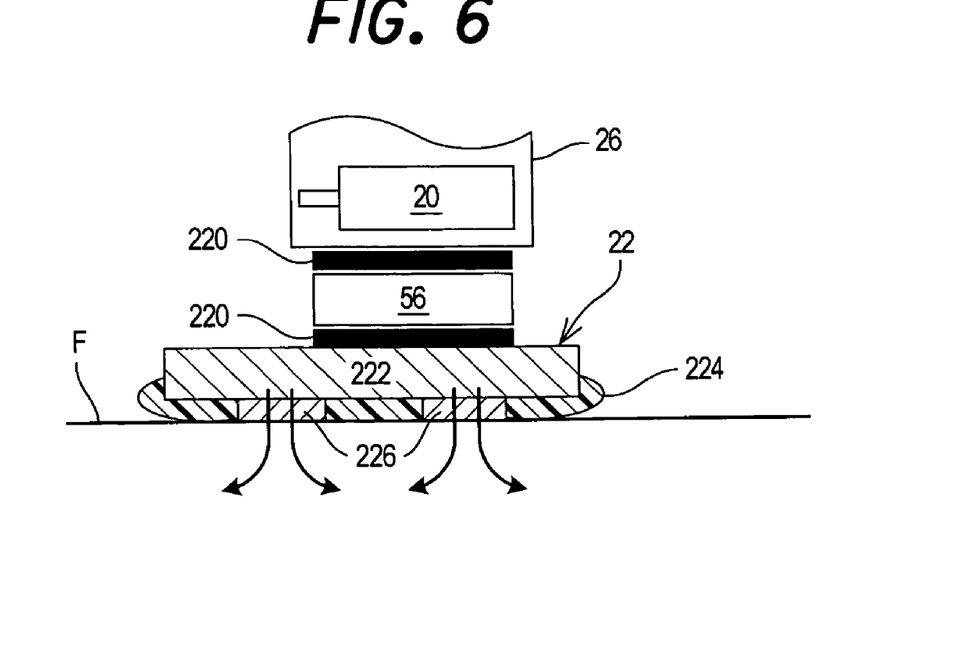
FIG. 6 is a view, similar to FIG. 4, but showing a situation when the foot of FIG. 4 lands on a floor such that the load acting on a cushioning member causes it to elastically deform.

When a foot 22 lands on the floor F during walking of the robot 1, the cushioning member 224 elastically contracts owing to the resulting load, as shown in FIG. 6, whereby the conductive member 226 accommodated in the depression 224a of the cushioning member 224 contacts the floor F. Therefore, as indicated by the arrows in FIG. 6 (and FIG. 4), the static electric charge electrified or buildup in the frame 222 and cushioning member 224 of the foot 22 is discharged to the floor F (and underneath members including the ground lying below the floor F) to be removed.

Figure 7:
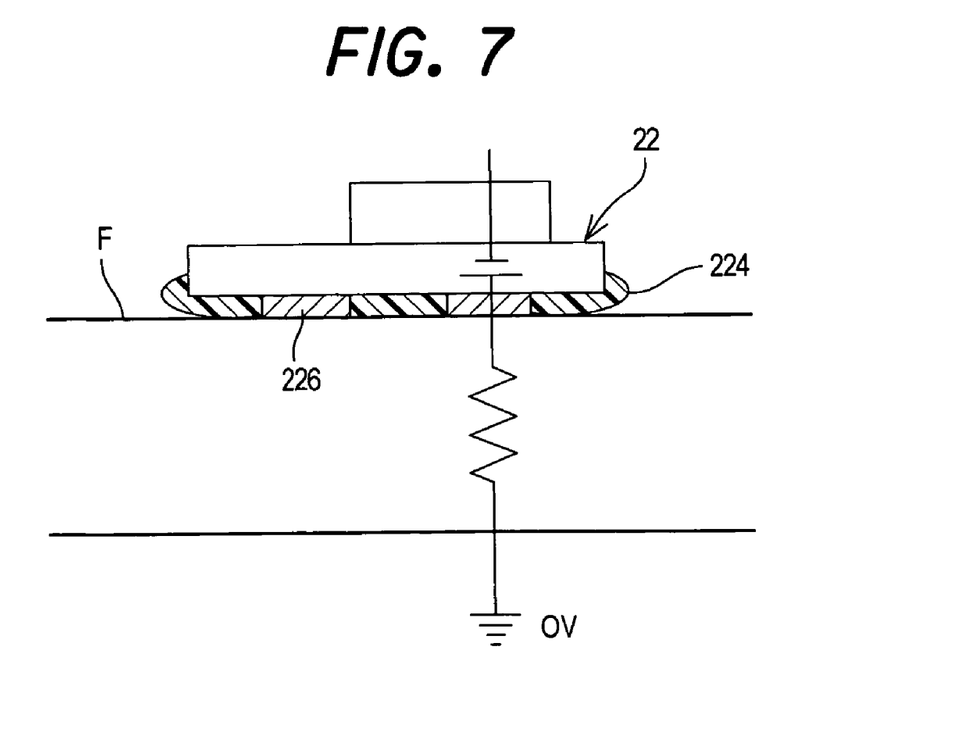
FIG. 7 is a view showing a reason why static electric charge accumulated in the foot flows toward the floor.

Although the floor F is ordinarily covered with a mat or resin-based covering that is not electrically conductive, static electric charge, like any form of electricity, flows from a point of higher potential to a point lower potential. Therefore, even if the surface of the floor F is not electrically conductive, the static electric charge accumulated in the foot 22 will, as depicted in FIG. 7, flow toward the floor F because the underlying floor members and joists, and the posts and other structural members of the building, lead to the ground (earth), which has zero potential. Moreover, the surface of the floor F, even if not conductive, is not an absolute insulator, so that it can be considered capable of enabling substantially total discharge of static electric charge that is small in terms of amount of energy.

Assuming that the floor F exhibits resistance of 1 MΩ and the voltage of the static electric charge is 4 kV, a discharge of up to 4 kV/1 MΩ=4 mA is possible. Current produced by static electric charge of low energy level does not reach this value. From this it follows that the structure described in the foregoing is capable of thoroughly discharging the static electric charge electrified or buildup in the foot 22 to the floor F.

Thus owing to the fact that the robot 1 according to this embodiment is provided with conductive members 226 disposed or countersunk in the cushioning member 224 that absorbs shock occurring when the foot 22 lands on the floor F, static electric charge that builds up or accumulated in the foot 22 can be discharged and removed as required. Electrified or accumulated static electric charge therefore does not become a source of noise for the force sensor 56 situated at a location above the foot 22.

Figure 8:
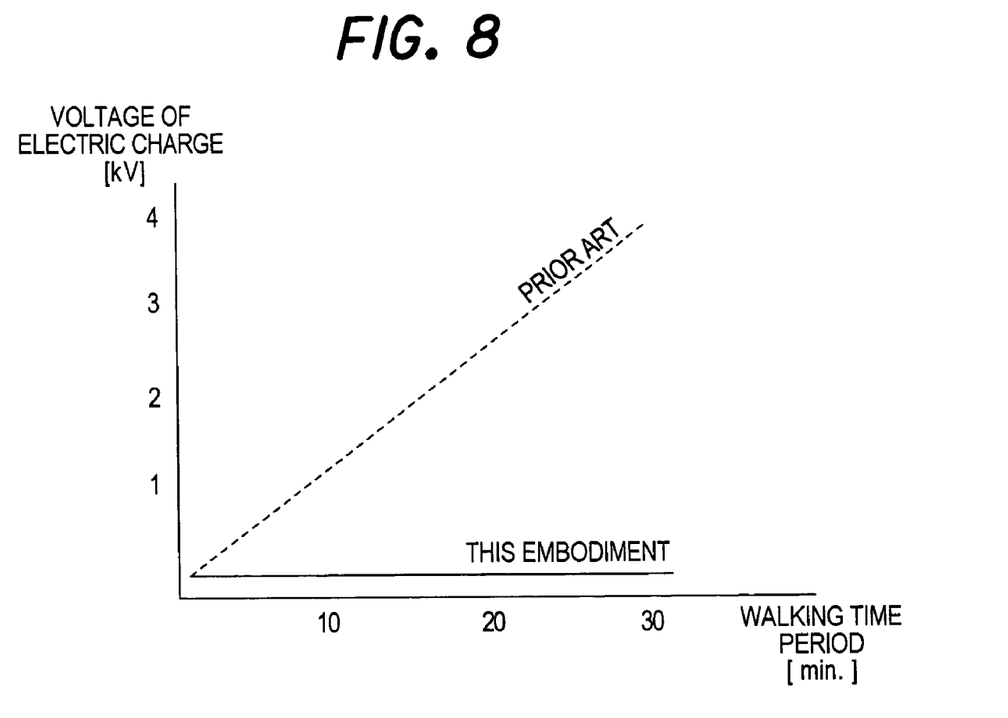
FIG. 8 is a graph showing a comparison of the voltage of static electric charge accumulated in the foot with that in a prior art robot foot.

FIG. 8 is a graph showing a comparison of the voltage of static electric charge accumulated or buildup in the foot 22 of the robot 1 according to this embodiment with that in a prior art robot foot (the one set out in the first reference ('785). The voltage of static electric charge increases or builds up progressively over time (walking time period) in the prior art robot. In the legged mobile robot according to this embodiment, on the other hand, the voltage of static electric charge exhibits no increase or buildup but stays constant at a low level. The characteristics will differ somewhat from those indicated by the curves in FIG. 8 depending on the material of the floor F and the ambient humidity.

It is a conventional practice to enhance the accuracy of a force sensor (designated 56 in this embodiment) by, for example, adopting the electrical insulator 220 as indicated in FIG. 4 that isolates the force sensor from the electric motor 20 so as to minimize the influence of the magnetic field of the motor 20. In this case, however, the foot 22 is insulated by the insulator 220 from members upward thereof, leading to accumulation of electric charge in the foot 22. Since the accumulated charge discharges to points of lower potential, a problem has been encountered in the prior art robot of the shock produced by the discharged energy causing disruption or malfunction of a processing circuit of the force sensor 56. This problem does not arise in the legged mobile robot according to this embodiment thanks to the configuration explained in the foregoing.

The cushioning member 224 of the foot 22 is made of an elastically deformable material (e.g., urethane rubber) attached to the sole and the conductive members 226 are disposed or countersunk in the cushioning member 224. This produces an effect of ensuring that the conductive members 226 do not interfere with the shock absorbing action of the cushioning member 224 and an effect of making the structure compact, in addition to the effects explained above.

The cushioning member 224 is provided with the depressions 224a and the conductive members 226 are accommodated in the depressions 224a so as to make contact with the floor F upon elastic deformation of the cushioning member 224. Since this produces an effect, in addition to the foregoing effects, of discharging and removing accumulated static electric charge when the load acting on the foot 22 during walking elastically deforms the cushioning member 224 to enable ground contact of the conductive members 226, even in the event of an electrical leak being experienced by, for example, the battery 76 housed in the housing unit 6, the leak current will not pass to the floor F insofar as no load is acting on the foot 22.

Moreover, the conductive members 226 remain within the depressions 224a in the absence of load and are therefore not in constant contact with the floor F during walking. Soiling of the conductive members 226 is therefore minimized so that they experience little degradation of discharge performance.

Figure 9:
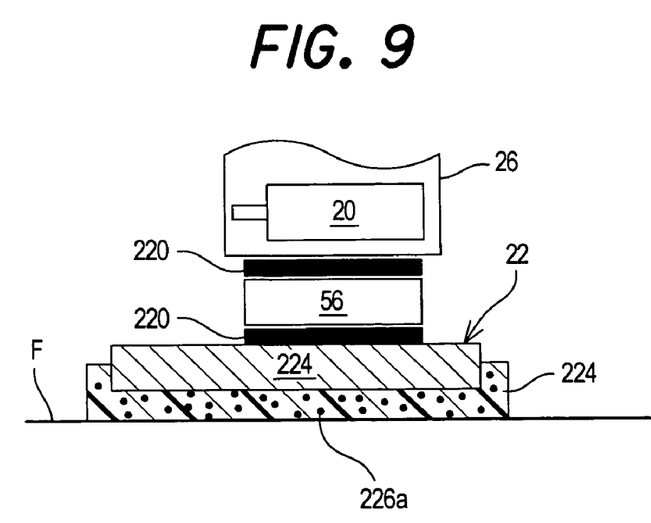
FIG. 9 is a view, similar to FIG. 4, but showing the structure of and around the foot of a legged mobile robot according to a second embodiment of this invention.

FIG. 9 is a view, similar to FIG. 4, but showing the structure of and around a foot 22 of a legged mobile robot according to a second embodiment of this invention.

The explanation of the second embodiment will be focused on the point of difference from the first embodiment.

In the second embodiment, the cushioning member 224 is made of electrically conductive rubber. The electrically conductive rubber is a material obtained by incorporating carbon black or other such electrically conductive material particles (conductive members 226) 226a in rubber. (The size of the conductive material particles 226a is exaggerated in the drawing.) In the second embodiment, therefore, the cushioning member 224 and conductive members 226 are integrally fabricated. In other words, the conductive members 226 are provided in the cushioning member 224 or the conductive members 226 are provided in the interior of the cushioning member 224.

Owing to this configuration adopted in the second embodiment, accumulated static electric charge continues to be discharged so long as the cushioning member 224 remains in contact with the floor F. As pointed out at the start, buildup of static electric charge is caused mainly by friction between the cushioning member 224 and the floor F during walking. In the second embodiment, substantially no static electric charge buildup actually occurs because the feet 22 alternately make contact with the floor F when the robot 1 is walking.

The robot 1 according to the second embodiment differs a little from that according to the first embodiment, which discharges static electric charge only under application of a load. However, it prevents static electric charge buildup or immediately discharges any buildup that occurs and, as such, provides substantially the same effects as explained with regard to the first embodiment.

Instead of electrically conductive rubber, it is possible to use a conductive resin, namely a material obtained by blending and dispersing electrically conductive metal particles, metal fiber, carbon black, graphite, carbon fiber, silver particles or the like in a non-conductive polymer matrix.

The first and second embodiments are thus configured to have a legged mobile robot (1) having a body (3), a plurality of legs (2) each connected to the body, and a foot (22) connected to a distal end of each leg through an ankle joint (18, 20R(L)), comprising; an electric motor (20) installed at a location between the foot and each of the legs and driving the ankle joint; a force sensor (56) installed at the location between the foot and each of the legs and detecting floor reaction force acting through the foot from a floor surface (F) on which the foot lands; a cushioning member (224) attached to the foot and cushioning impact that occurs when the foot lands on the floor surface; and a conductive member (226) disposed in the cushioning member.

In the robot, the cushioning member (224) is made of elastically deformable material and is attached to a sole of the foot (22), and the conductive member (226) is disposed in the cushioning member.

In the robot according to the first embodiment, the cushioning member (224) is formed with a depression (224a) which accommodates the conductive member (226), such that the conductive member contacts the floor surface when the cushioning member contracts.

In the robot according to the first embodiment, the cushioning member (224) is formed with depressions (224a) respective of which accommodates the conductive member (226).

In the robot according to the second embodiment, the cushioning member (224) is made of a rubber in which the conductive member (conductive material particles 226a) is incorporated.

In the robot according to the second embodiment, the cushioning member (224) is attached to a sole of the foot (22), such that the conductive member contacts the floor surface when the cushioning member contacts the floor surface.

In the robot according to the first and second embodiments, the electric motor (20) is installed at a position above the force sensor (56) in a vertical axis and an insulator (electric insulator 220) is inserted between the electric motor above and the foot below.

Although a six-axis force sensor is given as an example of a force sensor in the foregoing description, this is not a limitation and it is alternatively possible to use any kind of force sensor capable of detecting floor reaction forces acting on the robot through the feet.

Although the legged mobile robot is described as being a biped robot, this is not a limitation and the robot may be one having three or more legs.

Japanese Patent Application No. 2004-271614 filed on Sep. 17, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A legged mobile robot having a body, a plurality of legs each connected to the body, and a foot connected to a distal end of each leg through an ankle joint, comprising:
   an electric motor installed at a location between the foot and each of the legs and driving the ankle joint;
   a force sensor installed at the location between the foot and each of the legs and detecting floor reaction force acting through the foot from a floor surface on which the foot lands;
   a cushioning member attached to the foot and cushioning impact that occurs when the foot lands on the floor surface; and
   a conductive member, wherein the conductive member is disposed inward relative to an outer surface of the cushioning member and the conductive member is entirely disposed in the cushioning member.

2. The robot according to claim 1, wherein the cushioning member is made of elastically deformable material and is attached to a sole of the foot.

3. The robot according to claim 2, wherein the cushioning member is formed with a depression which accommodates the conductive member, such that the conductive member contacts the floor surface when the cushioning member contracts.

4. The robot according to claim 3, wherein the cushioning member is formed with depressions respective of which accommodates the conductive member.

5. The robot according to claim 1, wherein the electric motor is installed at a position above the force sensor in a vertical axis and an insulator is inserted between the electric motor above and the foot below.

* * * * *